L. H. ROGERS.
VALVE.
APPLICATION FILED FEB. 21, 1911.
995,484.
Patented June 20, 1911.
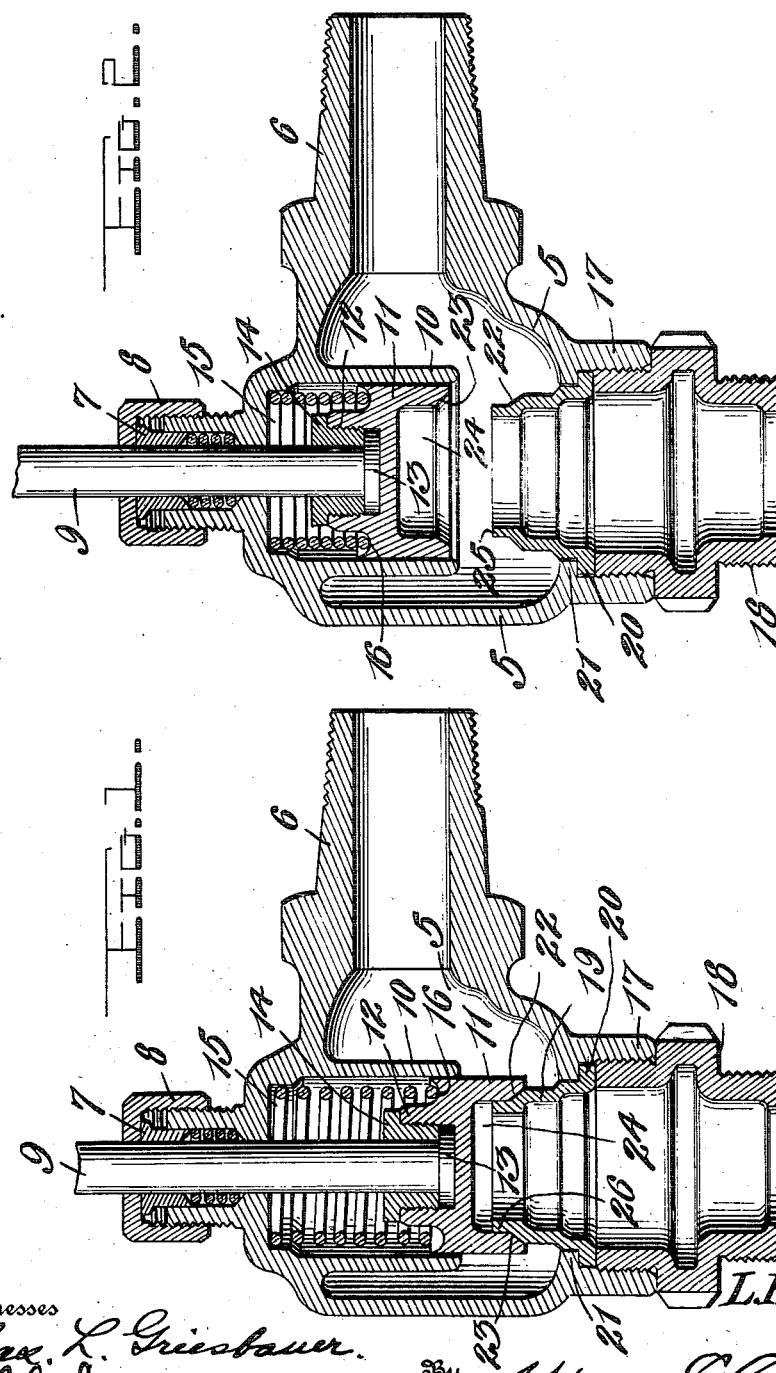
Witnesses
Chas. L. Griesbauer.
L. H. Ellis.
Inventor
L. H. Rogers,
By Watson E. Coleman.
Attorney

UNITED STATES PATENT OFFICE.

LEE H. ROGERS, OF PARSONS, KANSAS.

VALVE.

995,484.

Specification of Letters Patent.

Patented June 20, 1911.

Application filed February 21, 1911. Serial No. 609,975.

*To all whom it may concern:*

Be it known that I, LEE H. ROGERS, a citizen of the United States, residing at Parsons, in the county of Labette and State of Kansas, have invented certain new and useful Improvements in Valves, of which the following is a specification, reference being had to the accompanying drawings.

This invention relates to valves and more particularly to blow off cocks and has for its primary object to provide a valve of such construction that the accumulation of scale and sediment upon the valve and its seat is prevented.

A further object of the invention resides in the provision of a valve case having a tubular portion, a removable valve seat arranged in the valve case below said tubular portion, and a spring seated valve member movable into said tubular portion whereby pressure upon said valve member when in its open position is obviated.

A still further object of the invention is to provide a valve for the above purpose which is comparatively simple in construction, efficient in operation and which is of such construction that the various parts thereof may be easily and quickly assembled in operative position.

With the above and other objects in view, the invention consists of the novel features of construction, combination and arrangement of parts hereinafter fully described and claimed, and illustrated in the accompanying drawings, in which—

Figure 1 is a vertical section of a valve embodying my improvements, showing the same closed; and Fig. 2 is a similar view of the valve open.

The present invention has for its purpose the elimination of accumulations of scale and sediment upon the valve and valve seat of blow off cocks of that character commonly used on engine boilers. With this end in view, I provide the valve casing 5 which is formed with a laterally extending threaded connection 6. The valve case 5 is provided with the usual packing gland 7 and the bonnet 8 through which the valve stem 9 extends to render the casing watertight. The casing 5 has integrally formed therewith and extending into the same, a tubular extension 10 which receives the valve member 11 removably secured upon the lower end of the stem 9. The valve member 11 is formed with an interiorly threaded annular flange 12 of sufficient diameter to receive the flange 13 on the lower end of the valve stem. A follower nut 14 is threaded into the annular flange 12 of the valve member and engages the flange 13 to rigidly secure the valve member on the lower end of the stem. A coiled spring 15 is arranged within the tubular extension 10 and has one end seated in an annular groove 16 of the valve member and at its other end bears upon the valve case 5. The valve case is also provided with a tubular extension 17 which is interiorly threaded to receive one end of the coupling sleeve 18 whereby a pipe may be connected to the valve. This coupling sleeve also serves to retain the removable seat member 19 in position. This seat member is provided upon one end with an annular flange 20 for engagement with an annular shoulder 21 formed on the interior of the valve case 5. The seat member is gradually reduced in diameter and has formed upon its periphery adjacent to its smaller end an annular inclined seat 22 which is adapted to be engaged by a similarly inclined face 23 upon the lower end of the valve member 11. This lower end of the valve member is of tubular form to provide a chamber 24 into which the end portion 25 of the seat member extends when the valve is seated.

It will be observed that the end of the seat member 19 is spaced from the lower end of the tubular extension 10 of the valve casing so as to permit of the free flow of the water and sediment through the outlet of the valve, without the same entering the tube 10 which receives the valve member. When the valve is closed, the pressure is upon the seat member 19 below the seat 22 thereof so that said seat and the co-engaging inclined face 23 on the valve member are only in contact with the water momentarily when the valve is being opened or closed. The water is under considerable pressure and carries with it the scale and sediment which has accumulated in the boiler. Thus when the valve member is raised into the tubular portion 10 of the casing the force of the water carries the particles of scale and the sediment over the valve seat and into the outlet. The valve member is very quickly closed by means of the spring 15. Owing to the great pressure of the water, the valve seat is always kept perfectly clean of such accumulations so that the valve member 17 has close engagement thereon. The valve member when moved to open position is raised entirely above the lower end of the tubular portion 10 of the valve casing so that the water has no engagement therewith as it flows over the seat member beneath the lower end of said tube.

From the foregoing it is believed that the construction and operation of my improved valve will be obvious.

The device is extremely simple and is particularly adapted for use upon fire tube boilers or in other instances where great quantities of scale or sediment accumulate and are carried off through the cock.

It will of course be understood that the principle of my invention may be embodied in valves of other forms and that I do not wish to be restricted to the precise details of construction as illustrated in the drawings and above described.

By providing a removable seat member, the seat and valve member may be easily and quickly removed so that the interior of the valve casing may be readily cleaned and relieved of any incrustations which may accumulate upon the walls thereof. Owing to the peculiar arrangement of the valve member and its seat, the efficiency of devices of this character is materially increased and their period of serviceability prolonged. In view of its extremely simple construction, it will also be obvious that the valve can be manufactured at a comparatively low cost.

Having thus described the invention what is claimed is:—

1. A valve of the character described comprising a case consisting of a body portion and an interior tubular extension formed on the wall of the body portion, a seat member removably arranged in the valve case, the seat thereof being disposed in spaced relation to the open end of said tubular extension, and a spring seated valve member movable in the tubular extension, said valve member having a tubular portion to receive the end of the seat member, substantially as and for the purpose specified.

2. A valve comprising a casing having an interior tubular extension formed on one of its walls and open at one end, said casing also having an exterior tubular extension and provided at the inner end of said extension with an annular shoulder, a coupling sleeve threaded in said extension, a valve seat member having a flange thereon engaging said shoulder and lying between the same and the end of the sleeve, the other end of said valve seat member being spaced from the open end of the interior tubular extension and reduced in diameter, said valve seat member having an annular inclined seat, a valve member longitudinally movable within said interior tubular extension, a spring arranged in said extension engaging the valve member, said valve member having a tubular portion provided at its end with an annular inclined face to engage upon the seat, the end of the valve seat member extending into the tubular portion of the valve member, said spring normally retaining the valve member in its closed position, substantially as and for the purpose specified.

In testimony whereof I hereunto affix my signature in the presence of two witnesses.

LEE H. ROGERS.

Witnesses:
A. C. COSATT,
G. W. IDEN.